US007004142B2

(12) United States Patent
Ball et al.

(10) Patent No.: US 7,004,142 B2
(45) Date of Patent: Feb. 28, 2006

(54) ACCELERATION CONTROL METHOD FOR ENGINE

(75) Inventors: Kenneth Ball, Huddersfield (GB); Pierre B. French, Holmfirth (GB)

(73) Assignee: Holset Engineering Company, Ltd., (GB)

( * ) Notice: Subject to any disclaimer, the term of this patent is extended or adjusted under 35 U.S.C. 154(b) by 0 days.

(21) Appl. No.: 10/366,994

(22) Filed: Feb. 14, 2003

(65) Prior Publication Data

US 2003/0188532 A1    Oct. 9, 2003

(30) Foreign Application Priority Data

Feb. 14, 2002    (GB) .................................... 0203490

(51) Int. Cl.
  F02B 37/00    (2006.01)
  F02B 39/16    (2006.01)
  F02D 9/06     (2006.01)
  F02D 11/08    (2006.01)
  F02D 23/00    (2006.01)

(52) U.S. Cl. ........................................ 123/323; 60/602

(58) Field of Classification Search ................ 60/602; 123/323
  See application file for complete search history.

(56) References Cited

U.S. PATENT DOCUMENTS

| 3,430,436 | A | | 3/1969 | Bader et al. ................... 60/602 |
| 4,062,332 | A | | 12/1977 | Perr |
| 4,835,963 | A | * | 6/1989 | Hardy ......................... 60/602 |
| 5,315,899 | A | * | 5/1994 | Mochizuki ................... 123/323 |
| 5,647,318 | A | * | 7/1997 | Feucht et al. ................. 60/602 |
| 5,987,888 | A | * | 11/1999 | Weisman et al. ............ 123/436 |
| 6,152,853 | A | * | 11/2000 | Banks, III .................... 477/186 |
| 6,347,519 | B1 | * | 2/2002 | Kreso ........................... 60/602 |
| 6,401,457 | B1 | * | 6/2002 | Wang et al. ................... 60/602 |
| 6,480,782 | B1 | * | 11/2002 | Brackney et al. .............. 60/602 |
| 6,530,754 | B1 | * | 3/2003 | Vogel ........................... 60/602 |
| 6,539,714 | B1 | * | 4/2003 | Wang ........................... 60/598 |
| 6,560,963 | B1 | * | 5/2003 | Cornell et al. ................. 60/602 |
| 6,588,210 | B1 | * | 7/2003 | Kreso ........................... 60/602 |
| 6,609,495 | B1 | * | 8/2003 | Cornell et al. ............... 123/323 |
| 6,687,601 | B1 | * | 2/2004 | Bale et al. ..................... 60/602 |
| 6,698,203 | B1 | * | 3/2004 | Wang ........................... 60/602 |
| 6,804,601 | B1 | * | 10/2004 | Wang et al. ................... 60/602 |
| 2003/0188532 | A1 | * | 10/2003 | Ball et al. ...................... 60/602 |

* cited by examiner

*Primary Examiner*—Sheldon J Richter
(74) *Attorney, Agent, or Firm*—Krieg DeVault LLP

(57) ABSTRACT

A control system for an exhaust brake which operates to impede exhaust flow from a turbocharged combustion engine when the engine throttle is closed. The control system includes means for delaying application the exhaust brake only when the vehicle throttle is closed to allow the rotational speed of the turbo charger to drop thereby reducing wear to seal components.

6 Claims, 2 Drawing Sheets

ACCELERATION CONTROL METHOD FOR ENGINE

TECHNICAL FIELD

The present invention relates to a system for controlling operation of a vehicle exhaust brake. In particular, the invention relates to the control of an exhaust brake applied to a turbocharged engine.

BACKGROUND OF THE INVENTION

Exhaust brake systems are widely fitted to compression ignition engines (diesel engines) used to power large vehicles such as trucks. Many types of exhaust brake system are known, all generally comprising a valve in the exhaust line from the engine which when activated at least substantially blocks the engine exhaust. This creates backpressure, which retards rotation of the engine providing a braking force, which is transmitted to the vehicle wheels through the vehicle drive train. With some exhaust brake systems the brake can be set to activate automatically when the engine throttle is closed (ie the driver lifts his foot from the throttle pedal). In other systems the exhaust brake may require manual activation by the driver, such as depression of a brake pedal. Throughout the description and claims, the term engine throttle is used. Although a diesel engine does not include a carburettor, which has an air throttle, the term is used to describe the liner, mechanism, or system that varies the rate at which fuel is delivered to a diesel engine and thus its power output. Therefore, whenever the term engine throttle is used, herein, it refers to any of these devices.

It is now conventional for large diesel engines to be turbocharged. A turbocharger essentially comprises an exhaust driven turbine wheel, which rotates a compressor wheel. The turbine wheel and compressor wheels are mounted in respective housings on opposite ends of a rotatable shaft which passes through a bore in a bearing housing located between the compressor and turbine housings. The bearing housing houses journal and thrust bearings and associated lubrication systems and seals.

The shaft is typically sealed with respect to the bore of the bearing housing at the turbine wheel end by a shaft seal ring (or piston ring) which sits in an annular groove provided in the shaft behind the turbine wheel. The shaft seal prevents oil from the bearing lubrication systems from leaking into the turbine housing which can cause blue smoke and oil drips from the exhaust pipe, as well as preventing exhaust gas pollution of the bearing housing which can cause overheating and adversely effect bearing life.

Problems can arise with this conventional shaft seal arrangement where the turbocharged engine has an engine brake valve located downstream of the turbine. As the engine brake is activated the backpressure in the exhaust line, and thus in the turbine wheel housing, rapidly rises and can reach 4–5 bar (4–5 times atmospheric pressure). As pressure behind the turbine wheel thus increases the shaft seal ring can be pushed inboard. This movement, together with the high rotational speed of the shaft, can generate excessive frictional heating, which can cause the shaft seal ring to overheat. This in turn can cause the ring to be more susceptible to movement in the bore and induce a reduction in life of the seal. This problem is particularly pronounced during the running in period of the engine/turbocharger before the seal ring "beds in".

SUMMARY OF THE INVENTION

It is an object of the present invention to obviate or mitigate the above problem.

According to a first aspect of the present invention there is provided a control system for an exhaust brake which operates to impede exhaust flow from a turbocharged combustion engine when the engine throttle is closed, wherein the control system includes means for determining the rotational velocity of the turbocharger and is operable to apply the exhaust brake only when the vehicle throttle is closed and the rotational speed of the turbo charger is below a threshold value.

According to a second aspect of the present invention there is provided a control system for an exhaust brake system which operates to impede exhaust flow from a turbocharged combustion engine when the engine throttle is closed, wherein the control system is operable to delay application of the exhaust brake for a period of time following closure of the engine throttle.

By the simple expedient of delaying application of the exhaust brake following activation of the exhaust brake system, the present invention allows the turbocharger shaft speed to drop significantly before the back pressure in the turbine housing rises to levels sufficient to exert forces capable of moving the turbine end seal arrangement, such as the seal ring referred to above. This greatly reduces wear to seal components.

The invention may be applied to exhaust brake systems in which the exhaust brake is automatically activated, by for instance releasing the engine throttle, or in which manual activation is required by for instance depressing a pedal. In the latter case there will already be some delay between closure of the throttle and activation of the brake but the system according to the invention will operate to ensure that the delay is sufficient to allow the turbine speed to drop sufficiently to prevent wear to the seal as mentioned above. The invention operates to introduce delay between an exhaust brake activation signal or action (such as closing the throttle or depressing a brake pedal) and actual application of the exhaust brake (by closing the exhaust brake valve). In other words, introduction of a delay between activation of the brake system and closure of the exhaust brake valve.

The delay period may be predetermined or may be a function of the rotational speed of the turbocharger either immediately prior to closure of the throttle, or as monitored following application of the exhaust brake.

For instance, one embodiment of the present invention provides a control system for an exhaust brake which operates to impede exhaust flow from a turbocharged combustion engine when the engine throttle is closed, wherein the control system includes means for determining the rotational velocity of the turbocharger and is operable to activate the exhaust brake only when the vehicle throttle is closed and the rotational speed of the turbocharger is below a threshold value.

The present invention also provides a method of controlling activation of an engine exhaust brake which operates to impede exhaust gas flow from a turbocharged combustion engine upon closure of the engine throttle, the method comprising introducing a delay between closure of the throttle and application of the engine exhaust brake.

For instance in one embodiment of the invention the method comprises monitoring the turbocharger rotational speed, or an engine parameter indicative of the turbocharger engine speed, and activating the exhaust brake only when the throttle is closed and the turbocharger speed has dropped below a threshold value.

It will be appreciated that when the throttle is "closed", the fuel supply is not necessarily stopped completely, rather the fuel supply may drop to an idle level. References to throttle closure throughout this specification are to be interpreted accordingly. For instance, the act of throttle closure in respect of a vehicle will generally comprise release of the throttle pedal by the vehicle driver.

Other objects and advantages of the present invention will be apparent from the following description.

Specific embodiments of the present invention will now be described, by way of example only, with reference to the accompanying drawings, in which:

DESCRIPTION OF THE PREFERRED EMBODIMENT

Figure 1A:
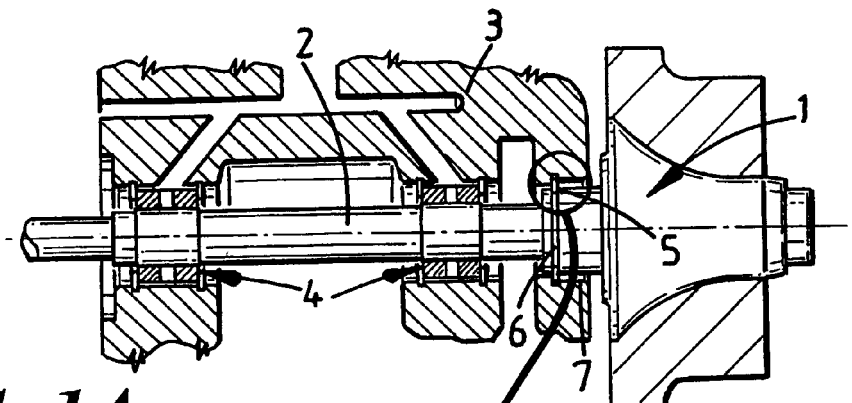
FIG. 1A is a sectional view of part of a turbine wheel/bearing housing assembly.
Figure 1B:
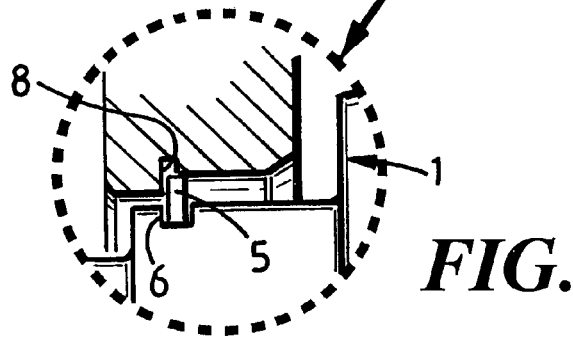
FIG. 1B is an enlarged view of the area of FIG. 1A circled by a dashed line.

FIG. 1A is a schematic cross-section through part of a turbocharger showing a turbine wheel 1 mounted to a turbocharger shaft 2 which extends through a bearing housing 3 supported on journal bearings 4. The turbine end of the shaft 2 is sealed with respect to the bearing housing 3 by a shaft seal ring 5 which sits in an annular groove 6 defined in the shaft 2 as shown in FIG. 1B which is an enlargement of the area circled by the dashed line in FIG. 1A. In this example the bore 7 in the bearing housing is stepped reducing in diameter to define an annular shoulder 8. This assembly is entirely conventional. It will be appreciated that much of the detail of the turbocharger construction is irrelevant to the present invention and this is not shown.

In a conventional exhaust brake control system, the exhaust brake is applied immediately and sometimes automatically after the engine throttle is closed. This results in a rapid rise in pressure in the turbine housing behind the turbine wheel which tends to push the seal ring 5 inboard. Axial movement of the seal ring 5 within the annular slot 6, coupled with the high rotational speed of the turbine wheel and shaft, can create excessive frictional heating and rapidly wear the seal leading to early replacement. The present invention greatly reduces this effect by the simple expedient of introducing a time delay between closure of the throttle and actuation of the exhaust brake.

Figure 2:
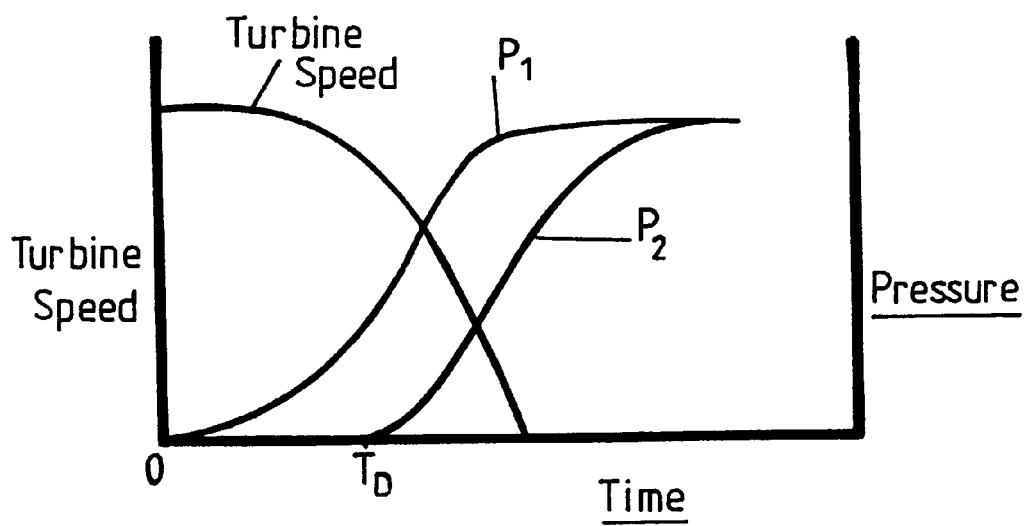
FIG. 2 is a graph illustrating the rate of pressure rise in the turbine vs. fall in turbine wheel speed as the engine throttle is closed.

Referring to FIG. 2, this shows how the turbine wheel/shaft speed drops when the throttle is closed at time=0. In a conventional automatic exhaust brake control system, the exhaust brake will be immediately applied so that the pressure will rapidly rise in the turbine housing as illustrated by line $P_1$. The effect of delaying the actuation of the exhaust brake in accordance with the present invention (either by introducing a predetermined time delay or waiting for the turbocharger to drop below a certain speed) is illustrated by the pressure line $P_2$. A relatively short time delay $T_D$ (typically of the order of 0.1 to 2 seconds) is sufficient to allow the turbine speed to drop significantly before-pressure levels required to exert substantial axial force on the seal ring are reached. There is thus a corresponding reduction in frictional heating of the seal ring as it moves thus greatly reducing seal ring wear.

The invention is not limited to exhaust brake systems in which the exhaust brake is automatically activated when the throttle is closed. For instance, in a system requiring manual activation of the exhaust brake, by for instance depressing a brake pedal, the delay will be introduced following that manual activation to ensure that there is sufficient delay for the turbocharger speed to drop as required.

Figure 3:
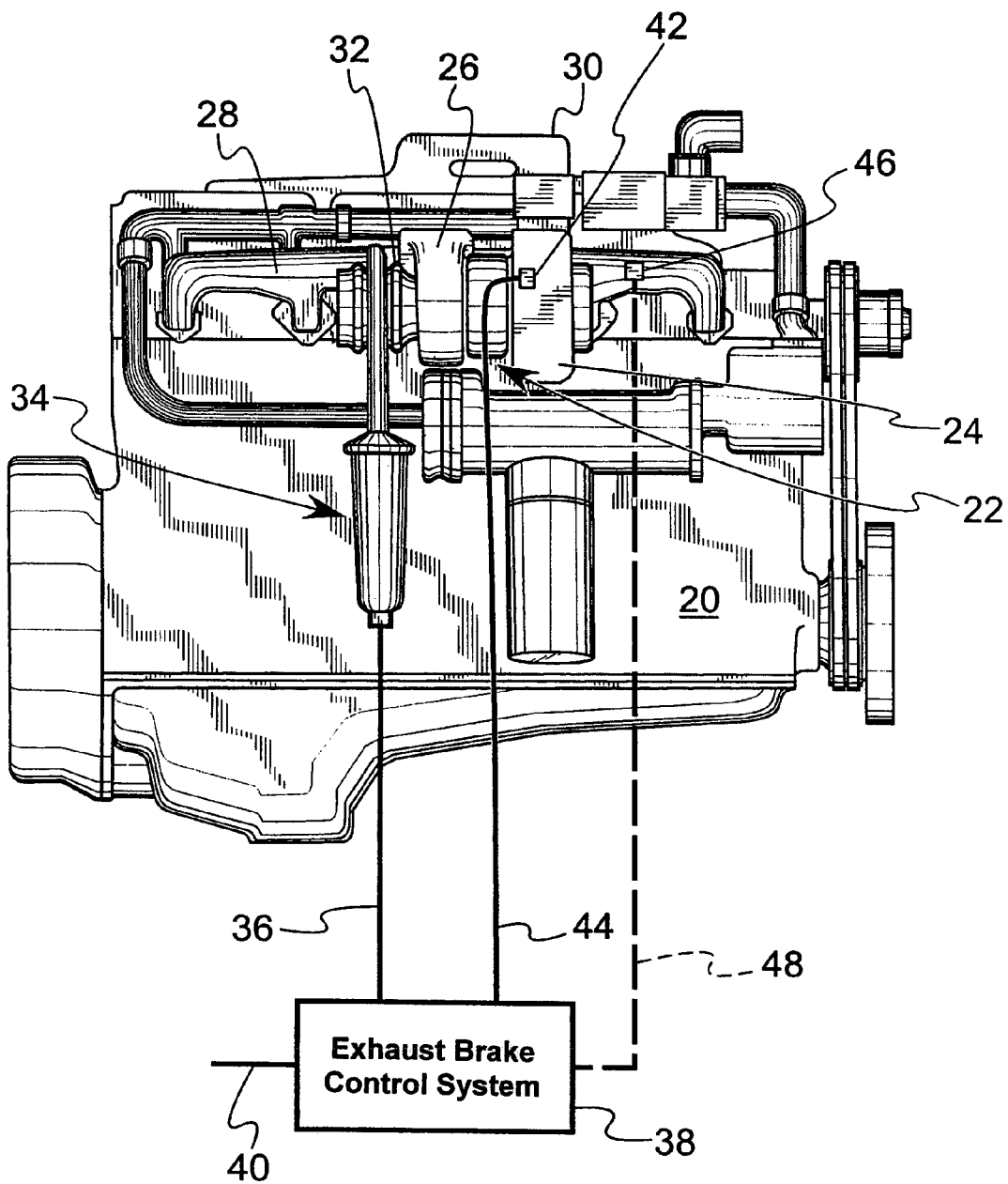
FIG. 3 is an illustrative side view of an engine including an exhaust brake control system of the present invention.

As shown in FIG. 3, an engine 20, incorporates a turbocharger 22 having a compressor 24+ turbine 26. Turbine 26 is fed with engine exhaust gases through manifold 28, causing turbine 26 to drive compressor 24 to produce pressurized air for delivery to engine 20 through intake manifold 30. An exhaust brake 32, selectively, blocks exhaust flow from turbine 32 in response to an actuator 34. Actuator 34 receives appropriate signals from line 36 connected to an exhaust brake control system 38 to cause exhaust flow from turbine 26 to be blocked or impeded. Control system 38 receives an external signal from line 40 to begin or terminate blockage. Line 40 receives a manual operator input or an input reflecting engine throttle closure.

The skilled person will be able to implement the present invention in a number of ways. For instance, in modern microprocessor controlled engine management systems the required time delay between closure of the throttle and application of the engine brake could readily be programmed into the engine management system and feed to the engine brake control system 38. The delay may be programmed as a fixed period of time following closure of the throttle or may be related to the engine and/or turbocharger speed immediately prior to closure of the throttle. For instance, the engine management system could incorporate a "look-up table" relating engine speed or turbocharger speed to required exhaust brake time delay.

The control system may have an internal time delay as described above, or the rotational speed of the turbocharger could be directly monitored from an appropriate sensor 42 providing a signal to the exhaust brake control system via line 44. The exhaust brake 32 is applied only when the throttle is closed and the monitored turbocharger speed has dropped to a predetermined value. Similarly, the exhaust brake control system 38 could monitor another parameter of the engine, such as exhaust manifold pressure through a sensor 46 mounted on manifold 28 and connected to exhaust brake control system 38 through line 48. The signal from sensor 46 is indicative of the turbocharger speed. In embodiments of the invention in which the application of the exhaust brake is directly controlled from determination of the turbocharger rotational speed it is possible that on some occasions there my be no time delay between closure if the vehicle throttle and application of the exhaust brake of the turbocharger speed is already below the threshold value when the throttle is closed.

While it may be convenient to incorporate the exhaust brake control system into an otherwise conventional engine management system, it will be appreciated that a separate control system could be provided which responds to closure of the throttle in any of the alternative ways suggested above.

The exact duration of the delay may vary to suit any particular turbocharger installation but will generally be a compromise between the desire to limit wear to the seal ring without significantly degrading exhaust brake performance.

The effect of exhaust brake backpressure on shaft seal ring wear is particularly pronounced during the running-in period of an engine/turbocharger. Accordingly, certain embodiments of the present invention may be designed to introduce a delay into the engine brake activation for a limited period only of the exhaust/turbocharger life cycle. For instance, the exhaust brake delay could be programmed to operate for only a predetermined number of miles travelled (with the possibility of re-setting this in the event that a turbocharger seal ring or entire turbocharger is replaced during the life of the engine/vehicle).

In summary, the essence of the present invention is the concept of introducing a delay in the operation of the exhaust brake following closure of the throttle and activation of the exhaust brake system (which may be automatic or require manual activation) and the skilled person will be able to implement the invention in a variety of different ways suited to different applications.

Having thus described the invention, what is claimed as novel and desired to be secured by Letters Patent of the United States is:

1. A control system for an exhaust brake which operates to impede exhaust flow from a turbocharged combustion engine when the engine throttle is closed, wherein the control system includes means for determining the rotational velocity of the turbocharger and is operable to apply the exhaust brake only when the vehicle throttle is closed and the rotational speed of the turbo charger is below a threshold value.

2. A control system according to claim 1, wherein the engine brake is applied automatically following closure of the throttle once the turbocharger speed has dropped to said threshold value.

3. A control system according to claim 1, wherein said means for determining the rotational velocity of the turbocharger includes means for monitoring the rotational speed of the turbocharger directly.

4. A control system according to claim 1, wherein said means for determining the rotational velocity of the turbocharger includes means for monitoring the rotational speed of the turbocharger from an engine parameter indicative of the turbocharger speed.

5. A control system according to claim 4, wherein said means for monitoring the rotational speed of the turbocharger from an engine parameter comprises means for determining engine exhaust manifold pressure.

6. A method of controlling activation of an engine brake which operates to impede exhaust gas flow from a turbocharged combustion engine upon closure of the engine throttle, the method comprising monitoring one of the turbocharger rotational speed, and an engine parameter indicative of the turbocharger engine speed, and activating the exhaust brake only when the throttle is closed and the turbocharger speed has dropped below a threshold value.

* * * * *